(12) United States Patent
Ponnarasu (10) Patent No.: US 10,712,883 B2
(45) Date of Patent: Jul. 14, 2020

(54) ELECTRONIC DEVICE VALIDATING MULTIPLE FINGER TOUCH DETECTION THROUGH DONUT SHAPED TOUCH ISLANDS, AND RELATED METHODS

(71) Applicant: STMicroelectronics Asia Pacific Pte Ltd, Singapore (SG)

(72) Inventor: Manivannan Ponnarasu, Tamil Nadu (IN)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 78 days.

(21) Appl. No.: 15/893,207

(22) Filed: Feb. 9, 2018

(65) Prior Publication Data
US 2019/0250731 A1   Aug. 15, 2019

(51) Int. Cl.
*G06F 3/044* (2006.01)
*G06F 3/041* (2006.01)

(52) U.S. Cl.
CPC .......... *G06F 3/044* (2013.01); *G06F 3/0418* (2013.01); *G06F 3/04186* (2019.05); *G06F 3/041662* (2019.05); *G06F 3/0446* (2019.05); *G06F 2203/04104* (2013.01)

(58) Field of Classification Search
CPC ...... G06F 3/044; G06F 3/0412; G06F 3/0416; G06F 3/0414; G06F 2203/04103
See application file for complete search history.

(56) References Cited

U.S. PATENT DOCUMENTS

| | | | |
|---|---|---|---|
| 7,489,306 B2 | 2/2009 | Kolmykov-Zotov et al. | |
| 7,864,161 B2 | 1/2011 | Hollemans et al. | |
| 8,803,844 B1 | 8/2014 | Green et al. | |
| 8,866,491 B2 * | 10/2014 | Ksondzyk | G01N 27/22 324/601 |
| 9,542,042 B2 * | 1/2017 | Ksondzyk | G01N 27/22 |
| 2002/0141643 A1 * | 10/2002 | Jaeger | G06F 3/0481 382/181 |
| 2004/0119744 A1 * | 6/2004 | Chan | G06F 3/04842 715/763 |
| 2008/0309626 A1 * | 12/2008 | Westerman | G06F 3/0485 345/173 |
| 2011/0084927 A1 | 4/2011 | Chang et al. | |

(Continued)

FOREIGN PATENT DOCUMENTS

CN        201765597 U      3/2011

*Primary Examiner* — Olga V Merkoulova
(74) *Attorney, Agent, or Firm* — Crowe & Dunlevy (57) ABSTRACT

Disclosed herein is a touch screen controller operable with a touch screen. The touch screen controller includes input circuitry to receive touch data from the touch screen, and processing circuitry. The processing circuitry acquires mutual capacitance touch strength values from the touch screen, determines when the mutual capacitance touch strength values define a pre-validated donut touch pattern, and reads self capacitance touch strength values for lines that are contained within bounds of the pre-validated donut touch pattern. If the self capacitance touch strength values for lines contained within bounds of the pre-validate donut touch pattern contain a singular peak value, the processing circuitry validates the pre-validated donut touch pattern as representing a single touch.

15 Claims, 5 Drawing Sheets

(56) References Cited

U.S. PATENT DOCUMENTS

| | | | |
|---|---|---|---|
| 2011/0084928 A1* | 4/2011 | Chang | G01R 27/2605 345/173 |
| 2014/0192027 A1* | 7/2014 | Ksondzyk | G01N 27/22 345/178 |
| 2017/0031493 A1* | 2/2017 | Ponnarasu | G06F 3/0418 |
| 2017/0038883 A1* | 2/2017 | Nagarajan | G06F 3/044 |
| 2018/0011596 A1* | 1/2018 | Korapati | G06F 3/0418 |
| 2018/0121010 A1* | 5/2018 | Ponnarasu | G06F 3/0416 |
| 2018/0188878 A1* | 7/2018 | Ponnarasu | G06F 3/0418 |
| 2018/0210607 A1* | 7/2018 | Ponnarasu | G06F 3/0418 |

* cited by examiner

ELECTRONIC DEVICE VALIDATING MULTIPLE FINGER TOUCH DETECTION THROUGH DONUT SHAPED TOUCH ISLANDS, AND RELATED METHODS

TECHNICAL FIELD

The present disclosure relates to the field of electronic devices and, more particularly, to touch screen equipped electronic devices capable of implementing validation of multiple single touch detection through the location of donut shaped islands in acquired touch strength values.

BACKGROUND

Touch screens are prevalent in today's computing environment. Portable computers, desktop computers, tablets, smart phones, and smartwatches may employ a touch screen to gain user input for navigation and control of these devices. Thus, discerning the intent of the user via touch inputs becomes an important feature of a touch screen device.

Figure 1:
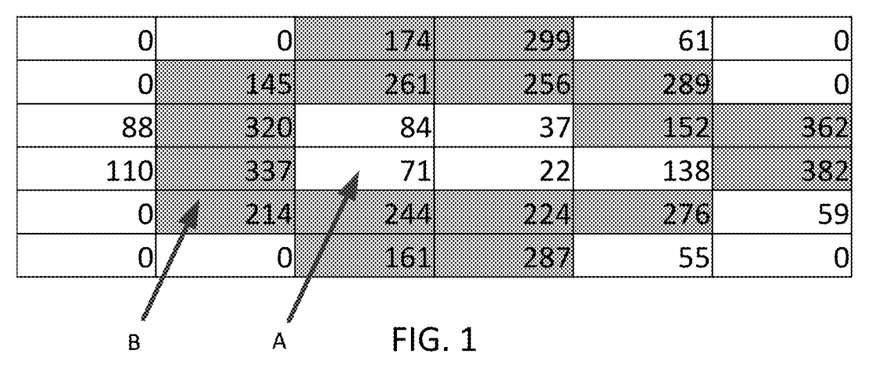
FIG. 1 is a chart showing a touch strength profile of a single touch to a touch screen device by a large finger.

A touch from a single large finger can be problematic to conventional touch sensing techniques. For example, under weak ground conditions, the detected touch strength value profile of such a single large finger touch may appear as shown in the chart of FIG. 1, which is to say that it may appear as a region of touch strength values of relatively lower magnitude (reference A) surrounded by a region of touch strength values of relatively higher magnitude (reference B). In FIG. 1, a threshold touch strength value of 140 is used to determine whether a touch strength value is of a "lower" magnitude or if a "higher" magnitude. A strength value below the threshold touch strength value of 140 is a lower magnitude indicated by reference A, while a strength value above the threshold touch strength value of 140 is a higher magnitude indicated by reference B.

It is common for conventional touch sensing techniques to support detection of multiple touches. Finger separation algorithms are commonly applied to each touch data island (a group of interconnected nodes with strength values having a magnitude above certain threshold, as described above) so as to determine and analyze for multiple simultaneous touches. When such finger separation algorithms are applied on touch strength values such as that shown in FIG. 1, there is a chance that this data will be incorrectly interpreted as multiple touches by small fingers, instead of correctly interpreted as a single large finger.

Recognizing the commercial desirability of a method to distinguish a touch by a single large finger from multiple touches made by small fingers, and to stop a touch by a large finger from being incorrectly separated by the finger separation algorithms into multiple simultaneous touches, techniques for detecting a single touch by a large finger have been developed. However, while such techniques have been successful at distinguishing a single touch by a large finger from multiple touches by a small finger, they face challenges when multiple touches are made by large fingers, particularly along a same force or sense line of the touch screen. Such multiple touches by large fingers can lead to unwanted touch separation, touch breaks, ghost touches, or undesirable touch merges.

Therefore, further development into touch sensing techniques capable of not only distinguishing a single touch by a large finger from multiple touches made by smaller fingers, but also of accurately determining multiple touches from large fingers, is needed.

SUMMARY

Disclosed herein is a touch screen controller operable with a touch screen. The touch screen controller includes input circuitry to receive touch data from the touch screen, and processing circuitry. The processing circuitry is to acquire mutual capacitance touch strength values from the touch screen, determine when the mutual capacitance touch strength values define a pre-validated donut touch pattern, and read self capacitance touch strength values for lines that are contained within bounds of the pre-validated donut touch pattern. If the self capacitance touch strength values for lines are contained within bounds of the pre-validate donut touch pattern contain a singular peak value, the processing circuitry validates the pre-validated donut touch pattern as representing a single touch.

If the self capacitance touch strength values that are contained within bounds of the pre-validate donut touch pattern contain multiple peak values, the processing circuitry is to identify a valley in the self capacitance touch strength values that are contained within bounds of the pre-validate donut touch pattern, separate the bounds of the pre-validated donut touch pattern into two candidate donut touch patterns separated from one another by the valley, and determine whether the mutual capacitance touch strength values respectively on each of the two candidate donut touch patterns each define a newly pre-validated donut touch pattern. If the self capacitance touch strength values that are contained with bounds of either pre-validated donut touch pattern contain a singular peak value, the processing circuitry is to validate that newly pre-validated donut touch pattern as a newly validated donut touch pattern representing a single touch.

For each newly validated donut touch pattern, the processing circuitry stores the bounds of that newly validated donut touch pattern. In a next frame, the processing circuitry reads new mutual capacitance touch strength values from the touch screen that are contained within bounds of the newly validated donut touch pattern, in the mutual capacitance sensing mode. If the new mutual capacitance touch strength values do not represent a new pre-validated donut touch pattern, then new self capacitance touch strength values are read from the touch screen that are contained within bounds of the newly validated donut touch pattern, in the self capacitance sensing mode. If the new self capacitance touch strength values that are contained within bounds of the newly validated donut touch pattern contain a singular peak value, the new mutual capacitance touch strength values are considered to indicate the newly validated donut touch pattern.

The processing circuitry, for each validated donut touch pattern, stores the bounds of that validated donut touch pattern, and in a next frame, reads new mutual capacitance touch strength values from the touch screen that are contained within bounds of the validated donut touch pattern, in the mutual capacitance sensing mode. If the new mutual capacitance touch strength values do not represent a new pre-validated donut touch pattern, then the processing circuitry reads new self capacitance touch strength values from the touch screen that are contained within bounds of the validated donut touch pattern, in the self capacitance sensing mode, and if the new self capacitance touch strength values that are contained within bounds of the validated donut touch pattern contain a singular peak value, considers the new mutual capacitance touch strength values to indicate the validated donut touch pattern.

The processing circuitry reads new mutual capacitance touch strength values from the touch screen for the entire touch screen, and if the new mutual capacitance touch strength values indicate a touch outside of the validated donut touch pattern, does not consider the new mutual capacitance touch strength values to indicate the validated donut touch pattern regardless of whether those of the new self capacitance touch strength values that are contained within bounds of the validated donut touch pattern contain a singular peak value. The processing circuitry, if the self capacitance touch strength values that are contained within bounds of the pre-validate donut touch pattern contain only a singular peak value and no other peak values, validates the pre-validated donut touch pattern as a validated donut touch pattern representing a single touch.

The processing circuitry determines whether the self capacitance touch strength values that are contained within bounds of the pre-validate donut touch pattern contain a singular peak value or whether the self capacitance touch strength values that are contained within bounds of the pre-validate donut touch pattern contain a multiple peak values by locating self capacitance touch strength values that are substantially greater in magnitude than their neighbors.

The processing circuitry determines whether the mutual capacitance touch strength values define a pre-validated donut pattern by locating a touch island comprised of lower mutual capacitance touch strength values within adjacent higher mutual capacitance touch strength values, and pre-validating the touch island to represent a pre-validated donut pattern by determining that each mutual capacitance touch strength value at a corner of bounds of the lower mutual capacitance touch strength values has a horizontal neighbor and a vertical neighbor that is substantially greater in magnitude.

Method aspects are also disclosed herein. One such method includes reading mutual capacitance touch strength values from a touch screen, in a mutual capacitance sensing mode, and determining when the mutual capacitance touch strength values define a pre-validated donut touch pattern. The method also includes reading self capacitance touch strength values from the touch screen that are contained within bounds of the pre-validated donut touch pattern, in a self capacitance sensing mode. If the self capacitance touch strength values that are contained within bounds of the pre-validate donut touch pattern contain a singular peak value, the pre-validated donut touch pattern is validate as a validated donut touch pattern representing a single touch.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 2:
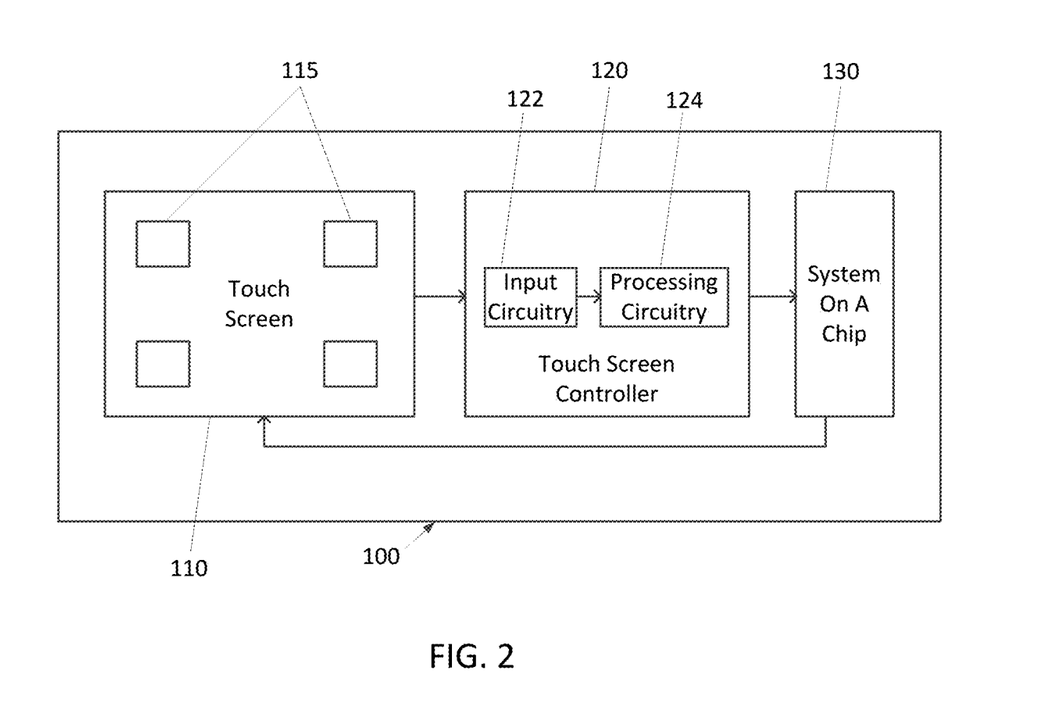
FIG. 2 is a block diagram of a touch screen device in accordance with this disclosure.

FIG. 2 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch screen display 110, coupled to a touch controller 120. The touch screen display 110 is designed to receive touch inputs from a user through a user's fingers or a stylus. The touch screen display 110 includes touch screen sensors 115 that are configured to detect touches (or other input actions such as hover or gesture motions) to the touch screen display 110. As a touch is sensed, the touch screen controller 120 may receive touch signals from the sensors 115 and analyze the touch signal(s). This analysis produces coordinates of the received touch. These coordinates may then be used by a system on a chip (SOC) 130 to manipulate operations with respect to applications and programs executing on the touch screen device 100.

It is noted that the same sensors 115 are capable of being used for both self-capacitance sensing and mutual capacitance sensing, and that therefore both the input circuitry 122 and the processing circuitry 124 are likewise capable of operating in both self-capacitance sensing and mutual sensing modes.

Being capacitive sensors, the sensors 115 are typically formed as an array of sensors from transparent patterned orthogonal conductive lines (not shown but known to those of skill in the art) formed on the surface, or integrated as part of, the touch screen 110. The intersections of the conductive lines (for examples, between columns and rows of conductive lines) form the individual touch sensors 115, and the touch screen controller 120 scans these sensing points and processes the generated signals to identify the location and type of a touch point or points. Thus, the touch screen display 110 may be considered as a touch map having XY coordinates wherein several touch regions (as defined by a set of XY coordinates) of possible touch information may be generated based on one or more touches to the touch screen display 110. The coordinates generated above are XY coordinates identifying the location of the touch on the touch screen 110.

In the mutual capacitance sensing mode, a forcing signal is applied to one subset of the conductive lines (referred to as force lines), and capacitance values are measured at a complementary subset of the conductive lines (referred to as sense lines). Since bringing a finger or conductive stylus near the surface of the sensor changes the local electric field, this causes a reduction in the mutual capacitance, and the capacitance change at every individual point on the grid can be measured to accurately determine the touch location by measuring the voltage in the other axis. Therefore, the output of mutual capacitance sensing is a two-dimensional matrix of values, with one value for each intersection between conductive lines. FIG. 1 is an example of a matrix of mutual capacitance sensing data fr a small portion of a touch sensor. Thus, it can be appreciated that mutual capacitance sensing allows multi-touch operation where multiple fingers, palms or styli can be accurately tracked at the same time.

In the self capacitance sensing mode, the forcing signal is applied to all conductive lines, and capacitance values are measured at each of the conductive lines. Bringing a finger or conductive stylus near the surface of the sensor changes the local electric field, increasing the self capacitance (capacitance between the conductive line and ground) in this instance. This results in a stronger sensed signal than with mutual capacitance sensing. However, since all lines are driven, the capacitance change can only be measured on each conductive line. Therefore, the output of mutual capacitance sensing is an array of values (or a singular column and a singular row of values), with one value for each individual conductive line. Therefore, it can be appreciated that self capacitance sensing allows for more precise touch measurements, but can only resolve touches by a single finger accurately, and multiple touches result in ghosting or misplaced location sensing.

As a consequence of the complementary advantages provided by mutual capacitance sensing and self capacitance sensing, it is desirable to use both mutual capacitance sensing and self capacitance sensing in a single device, with the output of the self capacitance sensing mode being used to verify the output of the mutual capacitance sensing mode.

Figure 3A:
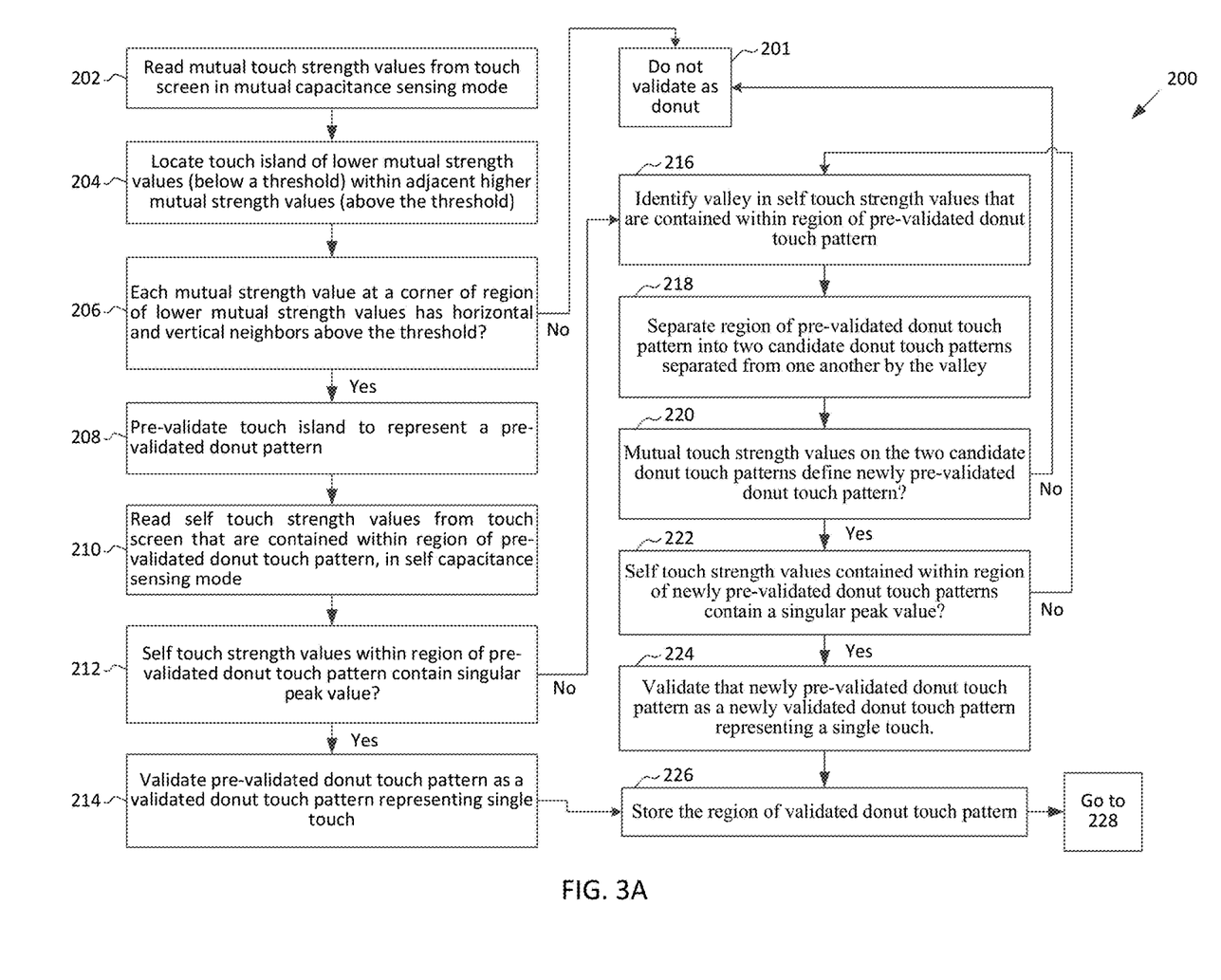
FIG. 3A-3B is a flowchart of a method of operating the touch screen device of FIG. 2 in accordance with this disclosure.
Figure 3B:
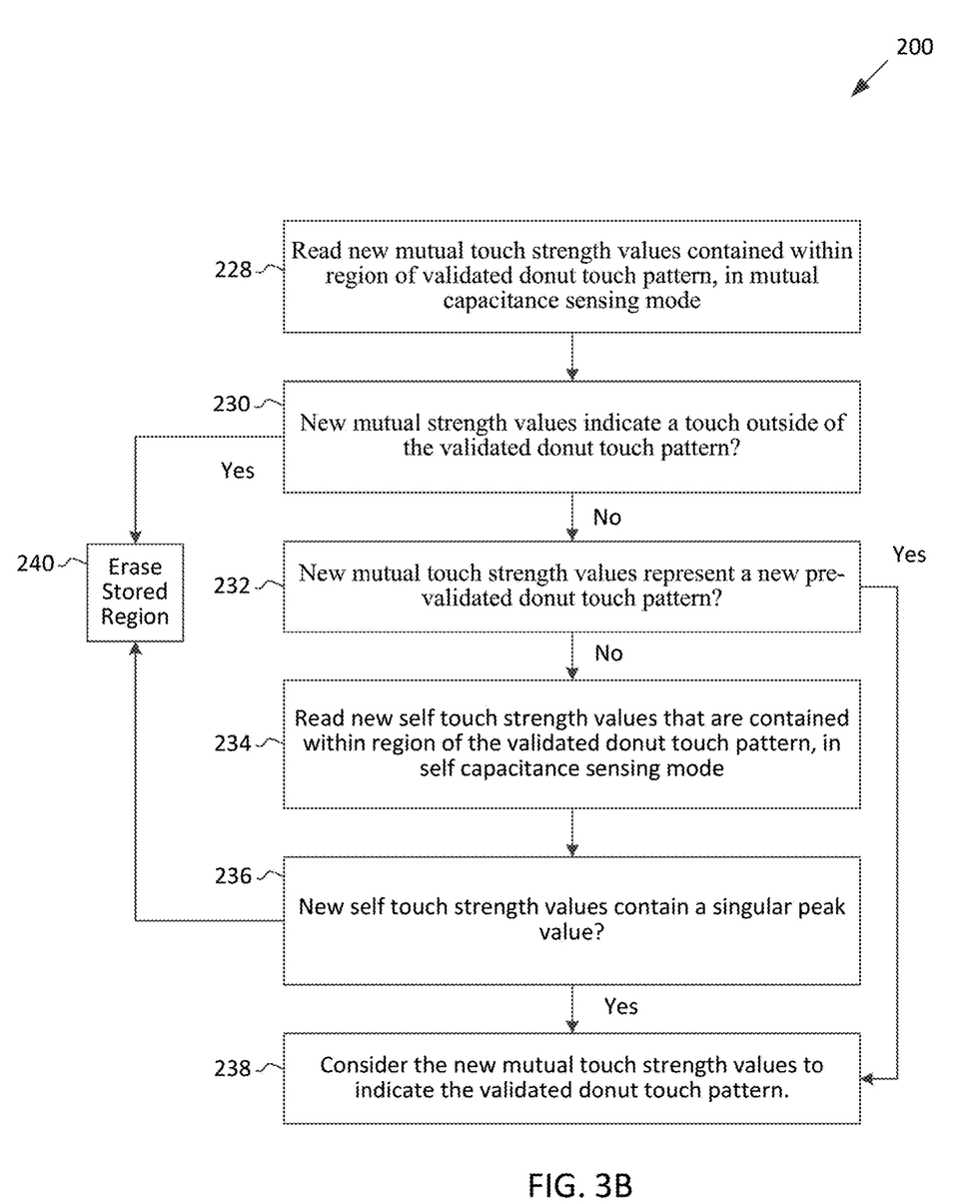

With initial reference to flowchart 200 of FIGS. 3A-3B, operation of the touch screen controller (TSC) 120 in both mutual capacitance and self capacitance sensing modes is now described. To begin, the TSC 120 reads mutual touch strength values from the touch screen 110 in the mutual capacitance sensing mode (Block 202). This is performed by sensing the capacitance at each intersection of conductive rows and columns, and converting those capacitances into strength values. The strength values are collected in a frame.

Figure 4:
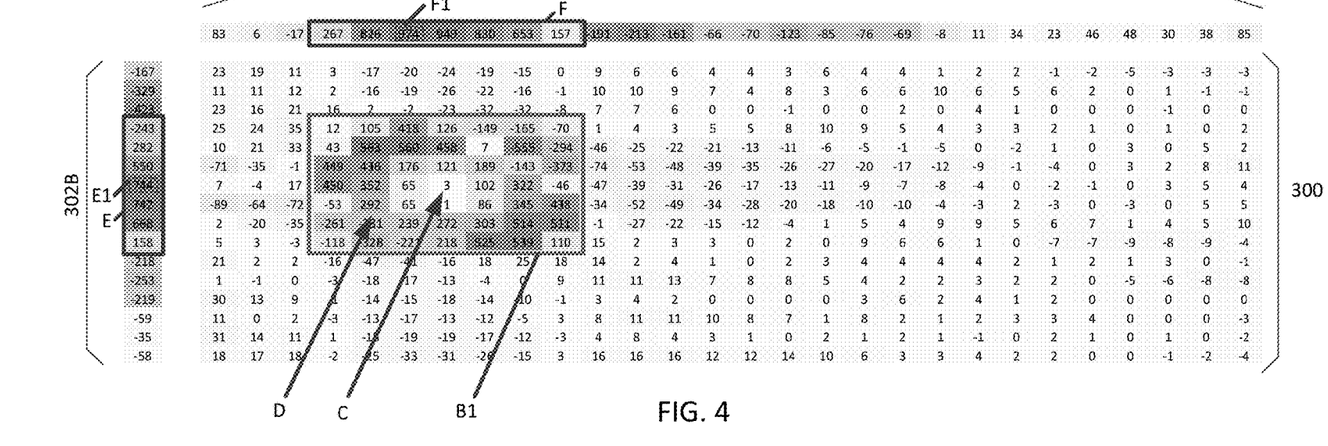
FIG. 4 is a chart showing mutual and self capacitance touch strength profiles of a single touch to a touch screen device by a large finger, in accordance with this disclosure.

Sample values in a frame of data can be seen in FIG. 4, where a matrix of mutual capacitance touch sensing data 300 is shown; note that the row 302A and the column 302B are not part of the matrix 300, and do not contain mutual capacitance touch sensing data.

After acquisition, the mutual touch strength values are searched for a potential "donut" (shown as region B1 in FIG. 4) by locating a touch island, or touch islands, of lower absolute mutual touch strength values (FIG. 4, reference C) at least partially surrounded by contiguous higher magnitude touch strength values (Block 204) (FIG. 4, reference D). A threshold touch strength value is used to differentiate whether a touch strength value is of a "lower" magnitude or of a "higher" magnitude. A strength value below the threshold touch strength value is a lower magnitude (indicated by reference C, containing all points contiguous with each other within region B1 that have values less than a threshold of 100, in FIG. 4), while a strength value above the threshold touch strength is a higher magnitude (indicated by reference D, containing all contiguous points that have values greater than the threshold in FIG. 4).

When a potential donut is located, then the mutual touch strength values at each corner of the region of the lower mutual touch strength values (reference C in FIG. 4) is identified to determine whether those corners each possess horizontal and vertical neighbors that are substantially greater in strength value (Block 206), or greater than a given threshold. If all corners do not have both horizontal and vertical neighbors that are substantially greater in value, then the donut is not validated (Block 201). If, however, all corners have both horizontal and vertical neighbors that are substantially greater in value, then the donut is pre-validated (Block 208).

Such a pre-validated donut can be seen inside the rectangular region B1 shown in FIG. 4. A pre-validated donut, such as the region B1, include all points, regardless of value, that are included within the touch island of lower mutual touch strength values (reference C) or included within the touch island of higher mutual touch strength values (reference D), and included within a rectangle drawn about the outermost members of the higher mutual touch strength values.

In this example, the mutual touch strength values occupy a 28×16 two dimensional matrix 300. Inside the rectangular region it can be observed that the island containing the lower mutual touch strength values of 65, 65, 3, and 1 and 86 (reference C) is contained with the island of substantially greater touch values (reference D). Checking the corners (of which 65, 65, 3, and 1 and 86 are each corners of the region C), it can be observed that the horizontal and vertical neighbors of each of these corners are above the threshold of 100. Therefore, pre-validation of the donut in FIG. 4 is proper.

Next, the TSC 120 reads self touch strength values from the touch screen 110 in the self capacitance sensing mode (Block 210). The self touch strength values can be seen in row 302A and column 302B of FIG. 4. In some instances the TSC 120 reads only those self touch strength values corresponding to conductive lines included within the region B1 representing the pre-validated donut, although in other instances the TSC 120 reads all self touch strength values.

The read self touch strength values are then checked to determine whether those self touch strength values corresponding to lines within the region representing the pre-validated donut (B1 of FIG. 4) contain a singular peak value in the column and a singular peak value in the row (Block 212). The self touch strength values of interest in FIG. 4, that is those corresponding to the rows and columns of region B1, can be seen in column E and row F of FIG. 4. The singular peak in the column is identified by reference E1, and the singular peak within the row is identified by reference F1.

It is to be appreciated that by "peak value" it is not simply meant a singular highest self touch strength value, as multiple peak values (with unequal self touch strength values) may be present. Instead, peak values are determined using techniques such as groove analysis.

If the TSC 120 determines that the self touch strength values within the region representing the pre-validated donut contain only a singular peak value, then the pre-validated donut touch pattern is validated as a donut touch pattern that represents a single touch by a large finger (Block 214). Referring again to FIG. 4, it can be observed from the self touch strength values that, within the region (shown as reference B1) representing the pre-validated donut touch pattern, there is but one peak E1 in the column E (at strength value 744), and but one peak F1 in the row F (at strength value 974). Therefore, validation of the donut of FIG. 4 as representing a single touch by a large finger is proper.

For each region containing a validated donut touch pattern, either located in Block 214 or in Block 224 (which will be described below), the bounds of that region is stored (Block 226). A sample validated donut B1, as explained above, is shown in FIG. 4.

Figure 5:
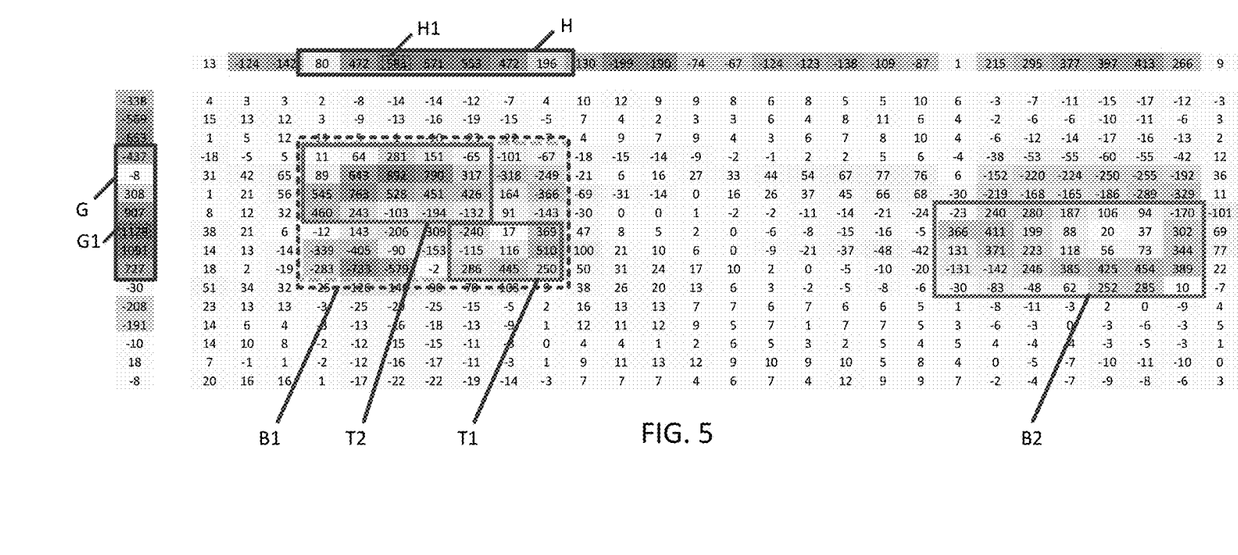
FIG. 5 is a chart showing mutual and self capacitance touch strength profiles of a touch by multiple large fingers to a touch screen device in a spaced apart fashion, in accordance with this disclosure.

Then, in a next sensing frame, new mutual touch strength values are obtained from the touch screen 110 by the TSC 120 in the mutual capacitance sensing mode (Block 228). Shown in FIG. 5 is a frame of touch data obtained subsequent to that of FIG. 4. Here, the bounds of the region B1 from FIG. 4 has been stored and is indicated by a dashed line, and the mutual touch strength values within that region can be seen. Also, here, it can be noted that another finger is simultaneously touching the touch screen, as shown by the region B2 to the right of region B1.

If the new mutual touch strength values indicate that the touch from the previous frame has moved outside of the bounds of the region representing the previously validated donut touch pattern (Block 230), then the bounds are erased (Block 240). If, however, the new mutual touch strength values indicate a touch, for the current frame inside the bounds of the region of previously validated donut touch pattern for the prior frame, then it is determined whether the newly read mutual touch strength values represent a newly validated donut touch pattern (Block 232), which is performed as described above at Block 220. As can be seen in FIG. 5, it can be seen that the touch on the left remains inside of the stored bounds of the region (reference B1). If the newly read mutual touch strength values are found to represent a newly validated donut touch pattern (which is not the case in region B1 of FIG. 5, as it lacks a region of mutual touch strength values below the threshold of 100 surrounded by a region of higher mutual touch strength values above the threshold of 100), then the new mutual touch strength values are considered to indicate the previously validated donut touch pattern in the region B1 (Block 232) and the coordinates thereof are considered to be the same as the coordinates of the previously validated donut touch pattern (Block 238).

If, however, the newly read mutual touch strength values are not found to represent a newly validated donut touch pattern, then new self touch strength values within the bounds of the region B1 of the previously validated donut touch pattern are acquired (Block 234) and checked to determine whether they contain a singular peak value (Block 236). If the new self touch strength values within the bounds of the region B1 of the previously validated donut touch pattern are found to contain a singular peak value, then the new mutual touch strength values within the bounds of the region of the previously validated donut touch pattern are considered to indicate the previously validated donut touch pattern in the region (Block 238) and the coordinates thereof are considered to be the same as the coordinates of the previously validated donut touch pattern. This is the case shown in FIG. 5, where the mutual touch strength values within the bounds of the stored region B1 do not represent a pre-validated donut (as they do not form a region of mutual touch strength values below the threshold of 100 surrounded by a region of higher mutual touch strength values above the threshold of 100), and instead appear to indicate two touch islands T1 and T2, but the self touch strength values do contain but a single peak value G1 in the column G (at value 1128) and a single peak H1 in the row H (at value 583). Therefore, the touch that the new values represent is considered to be the same touch as that which resulted in the bounds of the region B1 being stored, and the touch coordinates are likewise considered to be the same and merged into a single set of touch coordinates.

If, however, the new self touch strength values within the bounds of the region B1 of the previously validated donut touch pattern are found to contain multiple peak values, then the bounds of the region B1 of the previously validated donut touch pattern are erased (Block 240).

Referring back to the determination of whether the self touch strength values within the region B1 of the pre-validated donut touch pattern contain a singular peak value at Block 212, if the TSC 120 determines that the self touch strength values within the region B1 of the pre-validated donut contain multiple peak values, then a valley within the region of the pre-validated donut touch pattern is located (Block 216), and is used to split the pre-validated donut into two candidate donut touch patterns separated from one another by the valley (Block 218). The valley may be along horizontal or vertical conductive lines.

Figure 6:
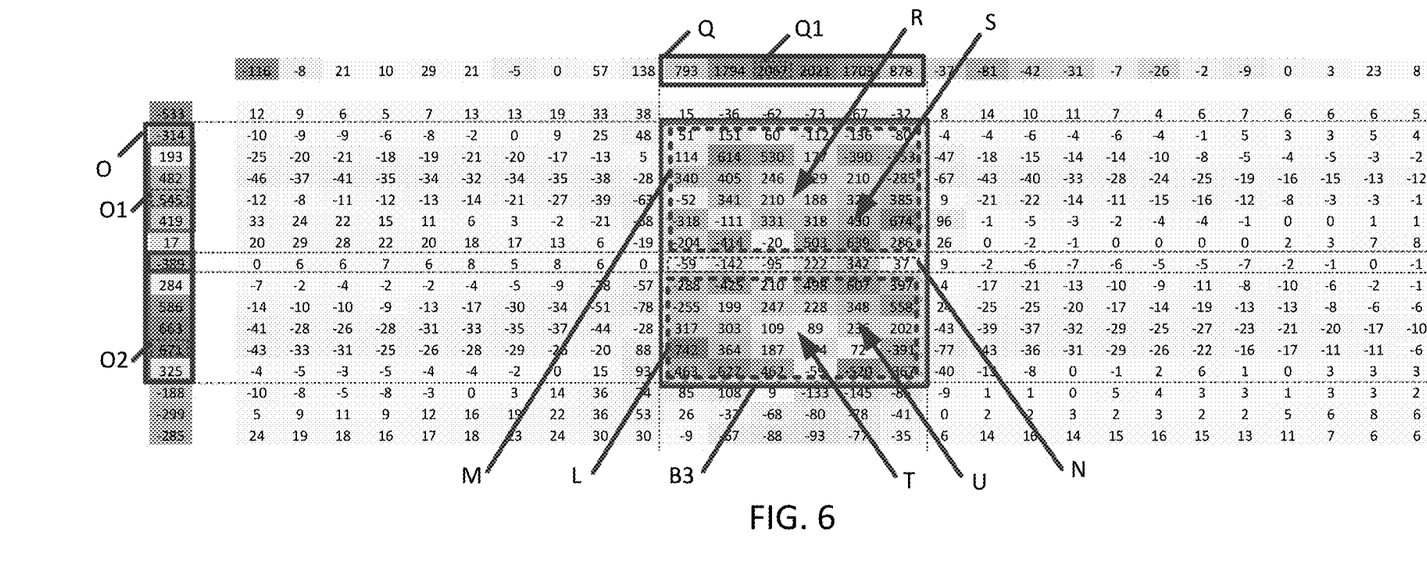
FIG. 6 is a chart showing mutual and self capacitance touch strength profiles of a touch by multiple large fingers to a touch screen device in a close fashion, subsequent to the single touch shown in FIG. 4, in accordance with this disclosure.

Shown in FIG. 6 is as a frame of data of sample mutual and self capacitance values for this scenario. As can be seen in the region (reference B3), the mutual touch strength values include islands of low strength values surrounded by an island of contiguous substantially higher strength values.

However, looking at the self touch strength values (in column O and row Q), it can be seen that while there is but one peak Q1 in the row Q (at value 2067), there are two peaks O1, O2 in the column O (one at value 482, and one at value 671). Therefore, a valley (reference N) is drawn along the horizontal axis in the row starting with a mutual touch strength of 0, separating the region B3 into two candidate donut touch patterns M and L. This location is chosen as the valley (reference N) because, as can be observed, the mutual touch strength values in this row are, on the whole, lower than those of its neighbors.

Then, each of the candidate donut touch patterns M and L is checked for pre-validation conditions (Block 220) as described above in Blocks 206 and 208. That is, each candidate donut touch pattern M and L is checked to see whether the mutual touch strength values at each of its corners has both horizontal and vertical neighbors substantially greater in value, and if so, is pre-validated. If not, the candidate donut touch pattern M or L is not pre-validated as a donut (Block 201).

Referring again to FIG. 6, it can be seen that the valley N has separated the mutual touch strength values into two separate regions M and L. In the upper region M, it can be seen that there is an island of low mutual touch strength values R (at value 188) surrounded by an island S of greater strength values (above the threshold of 100), and that these lower values (below the threshold of 100) have horizontal and vertical neighbors above the threshold. In the lower region L, it can be seen that there is an island of low mutual touch strength values T (at values 109 and 89) surrounded by an island U of greater strength values that exceed the threshold of 100.

For each candidate donut touch pattern pre-validated as a donut, self touch strength values within the region defining each pre-validated donut (or for the entire touch screen) are read, and it is determined whether they contain only a singular peak value (Block 222). Each pre-validated donut that contains a singular peak value is then validated as a donut touch pattern representing a single touch by a large finger (Block 224). As can be seen in FIG. 6, in both the upper M and lower L regions, there is but one self touch strength peak O2 in the column O (at value 545) for the upper region M and but one self touch strength peak O1 in the column O for the lower region L (at values 671), and but one self touch strength peak Q1 in the row Q (at value 2067) for both the lower region L and the upper region M.

As should be appreciated, the above described techniques provide for not only detection and identification of a touch by a single large finger in less than ideal conditions, but also provide for detection and identification of touches made by multiple large fingers, while avoiding the drawbacks of the prior art techniques.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. A touch screen controller operable with a touch screen, the touch screen controller comprising:
   input circuitry configured to receive touch data from the touch screen; and
   processing circuitry configured to:
      acquire mutual capacitance touch strength values from the touch screen;
      determine when the mutual capacitance touch strength values define a pre-validated donut touch pattern;
      read self capacitance touch strength values for lines that are contained within bounds of the pre-validated donut touch pattern;
      if the self capacitance touch strength values for lines contained within bounds of the pre-validated donut touch pattern contain a singular peak value, validate the pre-validated donut touch pattern as representing a single touch; and
      if the self capacitance touch strength values that are contained within bounds of the pre-validated donut touch pattern contain multiple peak values:
         identify a valley in the self capacitance touch strength values that are contained within bounds of the pre-validated donut touch pattern;
         separate the bounds of the pre-validated donut touch pattern into two candidate donut touch patterns separated from one another by the valley;
         determine whether the mutual capacitance touch strength values respectively on each of the two candidate donut touch patterns each define a newly pre-validated donut touch pattern; and
         if the self capacitance touch strength values that are contained with bounds of either pre-validated donut touch pattern contain a singular peak value, validate that newly pre-validated donut touch pattern as a newly validated donut touch pattern representing a single touch.

2. The touch screen controller of claim 1, wherein the processing circuitry is further configured to, for each newly validated donut touch pattern:
   store the bounds of that newly validated donut touch pattern;
   in a next frame, read new mutual capacitance touch strength values from the touch screen that are contained within bounds of the newly validated donut touch pattern; and
   if the new mutual capacitance touch strength values do not represent a new pre-validated donut touch pattern:
      read new self capacitance touch strength values from the touch screen that are contained within bounds of the newly validated donut touch pattern; and
      if the new self capacitance touch strength values that are contained within bounds of the newly validated donut touch pattern contain a singular peak value, consider the new mutual capacitance touch strength values to indicate the newly validated donut touch pattern.

3. A touch screen controller operable with a touch screen, the touch screen controller comprising:
   input circuitry configured to receive touch data from the touch screen; and
   processing circuitry configured to:
      acquire mutual capacitance touch strength values from the touch screen;
      determine when the mutual capacitance touch strength values define a pre-validated donut touch pattern;
      read self capacitance touch strength values for lines that are contained within bounds of the pre-validated donut touch pattern; and
      if the self capacitance touch strength values for lines contained within bounds of the pre-validated donut touch pattern contain a singular peak value, validate the pre-validated donut touch pattern as representing a single touch;
   wherein the processing circuitry is further configured to, for each validated donut touch pattern:
      store the bounds of that validated donut touch pattern;
      in a next frame, read new mutual capacitance touch strength values from the touch screen that are contained within bounds of the validated donut touch pattern; and
      if the new mutual capacitance touch strength values do not represent a new pre-validated donut touch pattern:
         read new self capacitance touch strength values from the touch screen that are contained within bounds of the validated donut touch pattern; and
         if the new self capacitance touch strength values that are contained within bounds of the validated donut touch pattern contain a singular peak value, consider the new mutual capacitance touch strength values to indicate the validated donut touch pattern.

4. The touch screen controller of claim 3, wherein the processing circuitry is further configured to: read new mutual capacitance touch strength values from the touch screen for the entire touch screen, and if the new mutual capacitance touch strength values indicate a touch outside of the validated donut touch pattern, do not consider the new mutual capacitance touch strength values to indicate the validated donut touch pattern regardless of whether those of the new self capacitance touch strength values that are contained within bounds of the validated donut touch pattern include a singular peak value.

5. The touch screen controller of claim 1, wherein the processing circuitry is configured to, if the self capacitance touch strength values that are contained within bounds of the pre-validate donut touch pattern contain only a singular peak value and no other peak values, validate the pre-validated donut touch pattern as a validated donut touch pattern representing a single touch.

6. The touch screen controller of claim 1, wherein the processing circuitry determines whether the self capacitance touch strength values that are contained within bounds of the pre-validate donut touch pattern contain a singular peak value or whether the self capacitance touch strength values that are contained within bounds of the pre-validate donut touch pattern contain a multiple peak values by locating self capacitance touch strength values that are substantially greater in magnitude than neighboring self capacitance touch strength values.

7. The touch screen controller of claim 1, wherein the processing circuitry determines whether the mutual capacitance touch strength values define a pre-validated donut pattern by:
locating a touch island comprised of lower mutual capacitance touch strength values within adjacent higher mutual capacitance touch strength values; and
pre-validating the touch island to represent a pre-validated donut pattern by determining that each mutual capacitance touch strength value at a corner of bounds of the lower mutual capacitance touch strength values has a horizontal neighbor and a vertical neighbor that is substantially greater in magnitude.

8. A method, comprising:
reading mutual capacitance touch strength values from a touch screen, in a mutual capacitance sensing mode;
determining when the mutual capacitance touch strength values define a pre-validated donut touch pattern;
reading self capacitance touch strength values from the touch screen that are contained within bounds of the pre-validated donut touch pattern, in a self capacitance sensing mode;
if the self capacitance touch strength values that are contained within bounds of the pre-validated donut touch pattern contain a singular peak value, validate the pre-validated donut touch pattern as a validated donut touch pattern representing a single touch;
if the self capacitance touch strength values that are contained within bounds of the pre-validated donut touch pattern contain multiple peak values:
identifying a valley in the self capacitance touch strength values that are contained within bounds of the pre-validated donut touch pattern;
separating the bounds of the pre-validated donut touch pattern into two candidate donut touch patterns separated from one another by the valley;
determining whether the mutual capacitance touch strength values respectively on each of the two candidate donut touch patterns each define a newly pre-validated donut touch pattern; and
if the self capacitance touch strength values that are contained with bounds of either pre-validated donut touch pattern contain a singular peak value, validating that newly pre-validated donut touch pattern as a newly validated donut touch pattern representing a single touch.

9. The method of claim 8, wherein, for each newly validated donut touch pattern, the method includes:
storing the bounds of that newly validated donut touch pattern;
in a next frame, reading new mutual capacitance touch strength values from the touch screen that are contained within bounds of the newly validated donut touch pattern, in the mutual capacitance sensing mode;
if the new mutual capacitance touch strength values do not represent a new pre-validated donut touch pattern:
reading new self capacitance touch strength values from the touch screen that are contained within bounds of the newly validated donut touch pattern, in the self capacitance sensing mode;
if the new self capacitance touch strength values that are contained within bounds of the newly validated donut touch pattern contain a singular peak value, considering the new mutual capacitance touch strength values to indicate the newly validated donut touch pattern.

10. A method comprising:
reading mutual capacitance touch strength values from a touch screen, in a mutual capacitance sensing mode;
determining when the mutual capacitance touch strength values define a pre-validated donut touch pattern;
reading self capacitance touch strength values from the touch screen that are contained within bounds of the pre-validated donut touch pattern, in a self capacitance sensing mode; and
if the self capacitance touch strength values that are contained within bounds of the pre-validated donut touch pattern contain a singular peak value, validate the pre-validated donut touch pattern as a validated donut touch pattern representing a single touch;
wherein, for each validated donut touch pattern, the method also includes:
storing the bounds of that validated donut touch pattern;
in a next frame, reading new mutual capacitance touch strength values from the touch screen that are contained within bounds of the validated donut touch pattern, in the mutual capacitance sensing mode; and
if the new mutual capacitance touch strength values do not represent a new pre-validated donut touch pattern:
reading new self capacitance touch strength values from the touch screen that are contained within bounds of the validated donut touch pattern, in the self capacitance sensing mode; and
if the new self capacitance touch strength values that are contained within bounds of the validated donut touch pattern contain a singular peak value, considering the new mutual capacitance touch strength values to indicate the validated donut touch pattern.

11. The method of claim 10, wherein, if the new mutual capacitance touch strength values indicate a touch outside of the validated donut touch pattern, do not consider the new mutual capacitance touch strength values to indicate the validated donut touch pattern regardless of whether those of the new self capacitance touch strength values that are contained within bounds of the validated donut touch pattern contain a singular peak value.

12. The method of claim 8, wherein if the self capacitance touch strength values that are contained within bounds of the pre-validated donut touch pattern contain only a singular peak value and no other peak values, the method includes validating the pre-validated donut touch pattern as a validated donut touch pattern representing a single touch.

13. The method of claim 8, wherein the method determines whether the self capacitance touch strength values that are contained within bounds of the pre-validated donut touch pattern contain a singular peak value or whether the self capacitance touch strength values that are contained within bounds of the pre-validated donut touch pattern contain a multiple peak values by locating self capacitance touch strength values that are substantially greater in magnitude than their neighbors.

14. A method comprising:
reading mutual capacitance touch strength values from a touch screen, in a mutual capacitance sensing mode;
determining whether the mutual capacitance touch strength values define a pre-validated donut pattern by:
locating a touch island comprised of lower mutual capacitance touch strength values within adjacent higher mutual capacitance touch strength values, wherein the lower mutual capacitance touch strength values are below a given threshold and wherein the higher mutual capacitance touch strength values are above the given threshold; and pre-validating the touch island to represent a pre-validated donut pattern by determining that each mutual capacitance touch strength value at a corner of bounds of the lower mutual capacitance touch strength values has a horizontal neighbor and a vertical neighbor that are both above the given threshold reading self capacitance touch strength values from the touch screen that are contained within bounds of the pre-validated donut touch pattern, in a self capacitance sensing mode; and if the self capacitance touch strength values that are contained within bounds of the pre-validated donut touch pattern contain a singular peak value, validating the pre-validated donut touch pattern as a validated donut touch pattern representing a single touch.

15. The method of claim 14, wherein the method determines whether the self capacitance touch strength values that are contained within bounds of the pre-validated donut touch pattern contain a singular peak value or whether the self capacitance touch strength values that are contained within bounds of the pre-validated donut touch pattern contain a multiple peak values by locating self capacitance touch strength values that are substantially greater in magnitude than their neighbors.

\* \* \* \* \*